Aug. 30, 1949.     W. C. GRABAU     2,480,646
SPEED MEASURING DEVICE
Filed Jan. 17, 1945     3 Sheets-Sheet 1
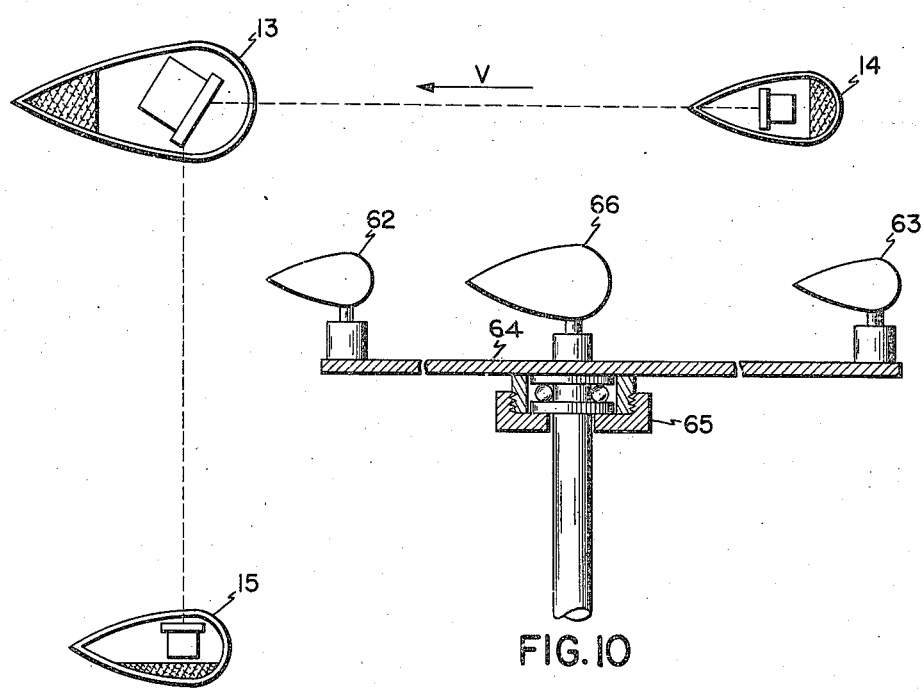
FIG. 3
FIG. 10
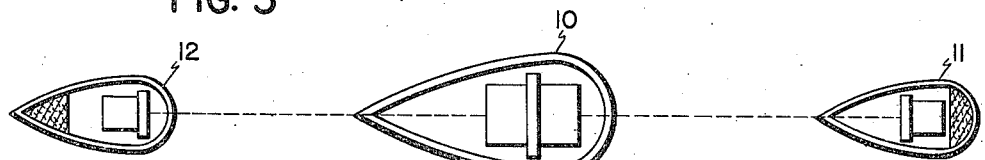
FIG. 2
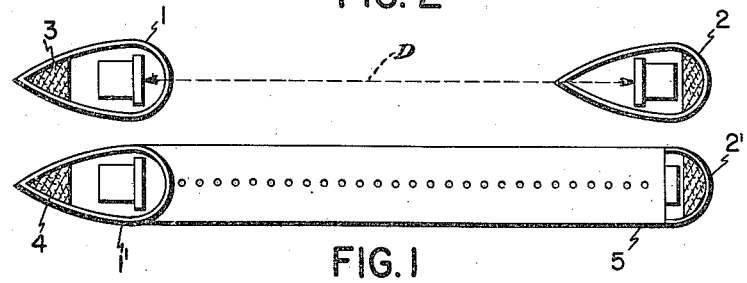
FIG. 1
FIG. 9
*INVENTOR.*
WILLIAM C. GRABAU
BY
HIS ATTORNEY

*INVENTOR.*
WILLIAM C. GRABAU
BY
HIS ATTORNEY

Patented Aug. 30, 1949

2,480,646

UNITED STATES PATENT OFFICE 2,480,646

SPEED MEASURING DEVICE

William C. Grabau, Brighton, Mass., assignor, by mesne assignments, to Raytheon Manufacturing Company, a corporation of Delaware Application January 17, 1945, Serial No. 573,285

5 Claims. (Cl. 181—0.5)

The present invention relates to a method and means of measuring relative velocity and may be particularly employed in the measurement of velocities of speeds of a vessel moving through a medium as, for instance, for ships on or in the water, or aircraft, and also for measurements of wind velocities, velocity of flow or flow meters.

The present invention employs the general principle set forth in the United States Patent No. 1,495,852, issued May 27, 1924, to Willy Kunze. In this patent the sound waves of the transmitter are picked up at two different points and velocity is measured by means of the phase difference of the sound arriving at the two receivers by use of the binaural principle. This method and apparatus need an operator and continuous observations and further do not take into account the necessary corrections which must be made due to the velocity of the sound in the medium. In a speed measurer, such as a "ship's log," automatic indication is necessary and, further, since the velocity of the sound in the medium may change from time to time as the ship goes into different water, an automatic means of correction due to the change of velocity in the medium is very desirable. The system described in this patent does not lend itself to automatic indication and it is impractical in most cases to have an observer always on watch for velocity measurements. In addition to this, other data which is usually derived from velocity measurements as, for instance, distance measurements, can not be obtained with the arrangement described in the above-mentioned patent.

These improvements and other advantages are provided for in the system described in the present invention which may employ a single transmitter and a single receiver or a single transmitter with two receivers spaced in such a way that the desired velocity components of the vessel through the medium, or the relative velocity of the medium and the vessel, or the velocity of the medium, if the object is stationary, may be readily determined in a continuous manner. The device further provides an automatic method of corrections for changes in velocity of sound in the medium and further gives the direct reading which may be calibrated in velocities.

In the present invention a sound wave is used which preferably is of continuous amplitude and sinusoidal in the form of $e = A \sin \omega t$, and in the specification set forth below three general species will be discussed dependent upon the relationship of the transmitters and receivers, as shown more particularly in the drawings annexed hereto illustrating embodiments of the same in which, Figs. 1, 2 and 3 show three different arrangements of transmitters and receivers on the vessel or in fixed position in a relatively moving medium;

Fig. 9 shows a further modification of Fig. 1; and

Fig. 10 shows a modification in which the units may align themselves in the direction of flow of the medium.

In the arrangement described in Fig. 1, I and I' are two transmitters which may be combined as a single unit and operated simultaneously. These units may each be in a stream-line casing 3 and 4, streamlined in the direction of normal flow of the medium. Two receivers 2 and 2' are respectively spaced a fixed distance D from the transmitters I and I'. In the case of the propagation of the sound wave between the transmitter I and the receiver 2, the wave is in the open medium whereas the propagation between the transmitter I' and 2' is in an enclosed tube 5 exposed to the water so that the water within the tube is always under the same conditions as the water outside the tube, with the exception that it does not move due to the blocking of the tube at the end by the transmitter and the receiver. This whole installation of transmitting and receiving units and the tube 5 may be fixed beneath the vessel in a place where the water has a normal flow and is indicative of the velocity of the vessel through the water. The line between the units I and 2 is preferably placed parallel to the keel line of the vessel but the device may be mounted in such a way as to be oriented in the desired direction.

If it is assumed that the distance between the transmitter I and the receiver 2 is $d$ and that this is the same distance between the units I' and 2', and further that the relative velocity of the units with regard to the medium in the direction of the arrow is $v$, then the phase relation of the sound wave at the receiver 2 with respect to that at the transmitter I is equal to an angle $$\frac{\omega d}{a-v}$$

where $\omega$ is equal to the angular vector velocity or $2\pi f$, where $f$ is the frequency of the transmitter and $a$ is the velocity of sound in the medium. The phase relation at the receiver $2'$ with respect to the transmitter $1$ or $1'$ is equal to $$\frac{\omega d}{a}$$

and the difference angle between $2$ and $2'$ is equal to $$\frac{\omega dv}{a(a-v)}$$

For all general purposes the factor $-av$ may be neglected so that the difference angle in the measurement of velocity for Fig. 1 is equal to $$\frac{\omega dv}{a^2} \text{ or } \frac{2\pi f dv}{a^2}$$

Figure 4:
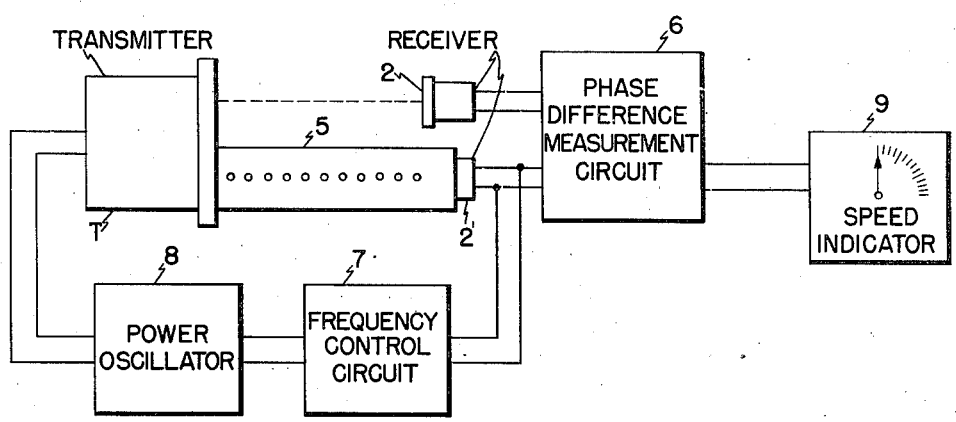
Figs. 4 and 5 illustrate block diagrams of apparatus in accordance with Figs. 1 and 2.

By selecting a square law circuit between $f$ and $a$, the velocity of sound in the medium may be eliminated. This arrangement is indicated in Fig. 4 where the transmitters $1$ and $1'$ comprise a single unit T and the receivers $2$ and $2'$ are connected to a phase difference measuring circuit $6$. The received frequency at $2'$ is also impressed upon a frequency control circuit $7$ which has a frequency square law characteristic. This frequency control circuit controls the output frequency of the power oscillator $8$ by means of which transmitters $1$ and $1'$ are operated.

The distance between the transmitters $1'$ and the receiver $2'$ is approximately one-half wave length or a multiple of one-half wave length of the sound ordinarily transmitted by the transmitter. This frequency, however, will vary dependent upon conditions of salinity, temperature and pressure which affect the velocity of the sound in the medium and therefore the measurement of the half wave length distance. In this arrangement resonance will be established through the frequency control circuit $7$ which is a feed-back circuit for establishing the frequency. By this arrangement the frequency is made to vary substantially in accordance with the square of the velocity of sound so that for all practical purposes variations in sound velocity may be eliminated. The phase difference measuring circuit to which both receivers $2$ and $2'$ are connected may be of the general type shown in Fig. 7 and the speed indicator $9$ operated thereby may be an ordinary voltmeter for alternating current or pulsating direct current.

In the arrangement indicated in Fig. 2, all of the units may be placed in the open water, the transmitter $10$ in line between the forward receiver $11$ and the aft receiver $12$. The units may be arranged in a straight line parallel to the keel of the vessel or in the case of an aircraft in the direction of or parallel to the fuselage. The phase difference measurement between the sound arriving at the two receivers may be expressed by the value $$\frac{2\omega dv}{a^2-v^2}$$

or $$\frac{4\pi f dv}{a^2-v^2}$$

In these cases $v^2$ which is of a different order of magnitude than $a^2$ may be neglected so that the phase difference angle is measured by the quantity $$\frac{4\pi f dv}{a^2}$$

Here again the general circuit of Fig. 4 may be used.

Figure 5:
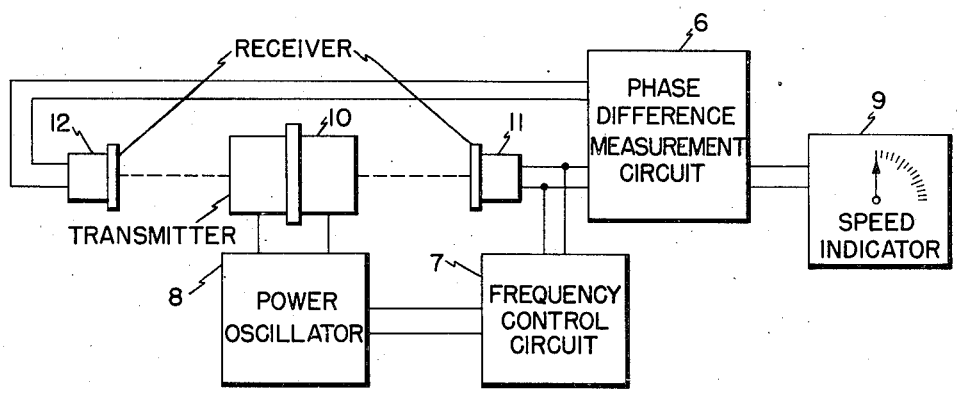

The specific arrangement is indicated in Fig. 5 where all of the elements are the same as in Fig. 4 with the exception of the transmitter and receiving units which are as indicated in Fig. 2.

In the arrangement of Fig. 3, the transmitter $13$ may be used with two receiving units disposed at right angles with the receiver $14$ in the line of motion of the vessel and the receiver $15$ at right angles thereto. The relative component of motion of the units may be assumed to be in the direction of the arrow $v$. The phase difference is measured in this case between the receiver $14$ and the transmitter $13$ and also between the receiver $15$ and the transmitter $13$. The arrangement of Fig. 1 may, if desired, be used for this purpose. In this case the phase differences would be measured between the receiver $2$ and the transmitter $1$ and the receiver $2'$ and the transmitter $1'$.

In the method just described, after each phase difference is obtained, the reciprocal is obtained and then the difference between the reciprocals is obtained which is a direct measurement of the desired velocity. $\theta_1$, the phase difference between $14$ and $13$, is equal to $$\frac{\omega d}{a-v}$$

$\theta_2$, the phase difference between $15$ and $13$, is equal to $$\frac{\omega d}{a}$$

The difference of reciprocals $$\frac{1}{\theta_1}-\frac{1}{\theta_2}$$

is equal to $$\frac{-v}{\omega d}=\frac{-v}{2\pi f d}$$

Figure 6:
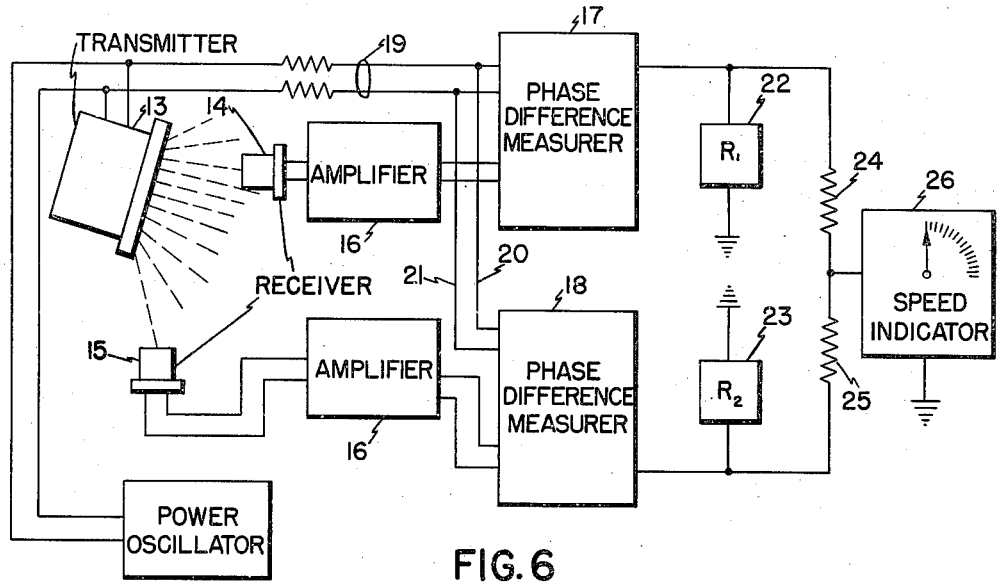
Fig. 6 illustrates a block diagram used in relation to Fig. 3.
Figure 7:
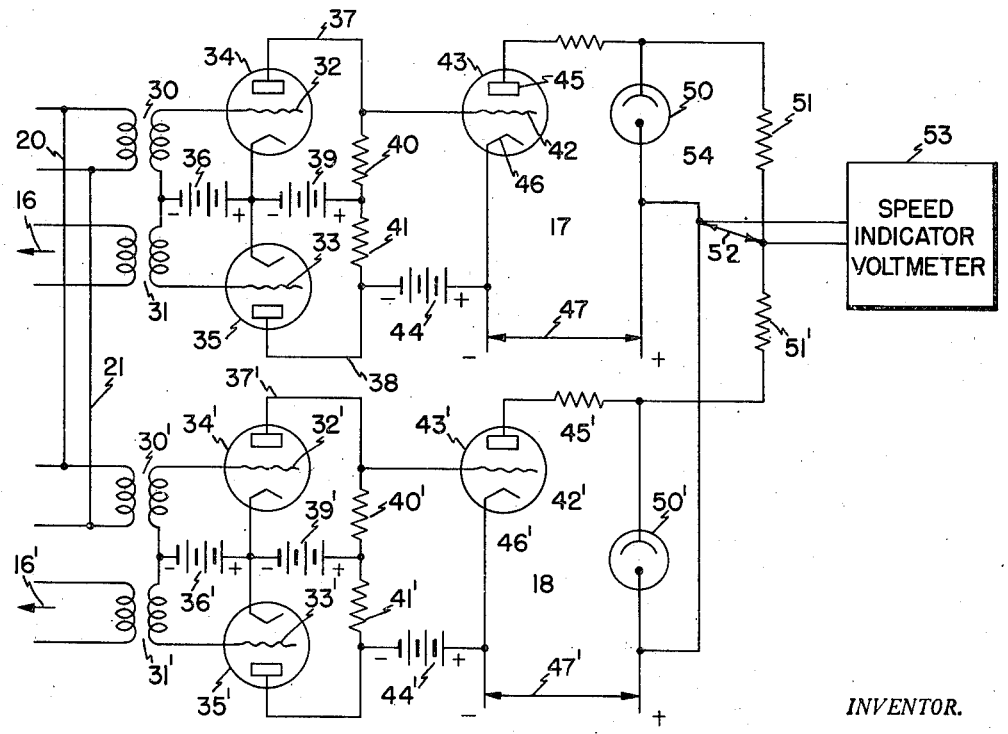
Fig. 7 shows a schematic diagram used in relation to Fig. 3.

In the circuit arrangement of Figs. 6 and 7 this last quantity is measured directly. Fig. 6 shows the circuit in block diagram and Fig. 7 shows a schematic wiring diagram of the arrangement. The signal picked up by the receiver $14$ may, if desired, be passed through an amplifier $16$ although in general, since the receiver and transmitter are close together, the amplifiers may be eliminated. Similarly, the signal picked up by the receiver $15$ may be passed through the amplifier $16'$ to the phase difference measuring circuit $18$ while the receiver $14$ has its output connected to the phase difference measuring circuit $17$. The direct transmitted signal is also connected to the phase difference measurers $17$ and $18$ through the line $19$ which branches off in two branches $20$ and $21$ to connect, respectively, to the phase difference measurers $17$ and $18$. The outputs of the phase difference measurer are coupled to ground through constant voltage devices $22$ and $23$ such, for instance, as a saturated reactor or a gaseous glow tube. This produces a reciprocal value of the phase difference and the difference is measured through a bridge arrangement employing impedances $24$ and $25$ across which to ground is connected the speed indicator $26$ which may be of the type of a voltmeter commonly used in the art. If the phase difference alone is to be measured, this may be accomplished by using a suitable instrument in place of $22$ or $23$, such as a bolometer, or some current integrating device.

Figure 8:
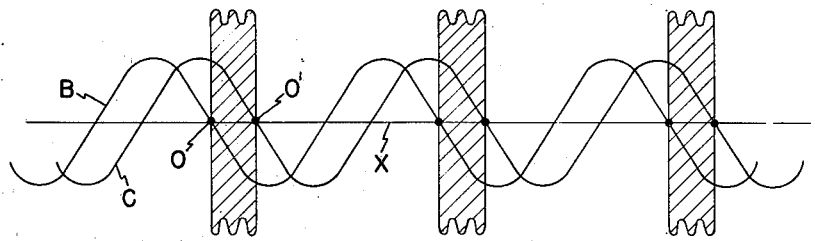
Fig. 8 shows some curves illustrating the principle of operation of the circuits described.

The arrangement of the phase difference measuring circuits and the bridge circuit are shown more clearly in Fig. 7. Here the input transformers 30 and 31 impress respectively the direct signal from the transmitter and the signal picked up by the receiver on the grids 32 and 33 of the vacuum tubes 34 and 35, respectively. It is assumed that the wave form impressed by the transformers 30 and 31 upon the grids of the vacuum tubes 32 and 33, respectively, will be sinusoidal and that the interval on the axis where the wave becomes zero provides a phase measurement which is proportional to a time interval. This is indicated in the curves of Fig. 8 where the wave B may be represented as a direct pulse and the wave C as the indirect pulse. The point O where the wave B intersects the axis will occur a certain time interval before the intersection of the sinusoidal curve C on the axis at O'. The interval on the axis between O and O' is a direct measurement of the phase. In the measurement of this interval the vacuum tubes 34 and 35 are negatively biased by means of a battery 36 and the anode-cathode circuits 37 and 38 have impressed upon them a positive potential by means of the battery or direct current supply 39, each through a resistance 40 and 41, respectively, which may be of equal magnitude. During the time when the grids 32 and 33 are positively biased, current will be flowing in the anode-cathode circuits to provide a balance of voltage drop through the resistors 40 and 41 as applied to the grid 42 of the vacuum tube 43. Since, however, the grid 42 is permanently negatively biased by the direct current source 44, no current will flow between the anode 45 and the cathode 46 in the tube 43. A positive bias is, of course, impressed upon this anode-cathode circuit through a suitable power source indicated by the arrowed line 47. When the grid 32 on the tube 34 cuts off, then a strong positive bias will be applied to the grid 42 and current will flow through the anode-cathode circuit of the vacuum tube 43.

In the operation of this phase difference measurer, the sinusoidal wave B (Fig. 8) will be applied to the grid 32 positively until the zero has been reached, whereupon the bias 36 will produce a cutoff and reduce the voltage across the impedance 40 so that the vacuum tube 43 will begin to pass current at the point O, Fig. 8. This current will continue to flow until the point O', whereupon the grid 33 of the tube 35 will cut off and the positive bias produced across the impedance or resistance 41 will vanish, thus permitting the negative bias from the source 44 to cut off the anode-cathode current in the vacuum tube 43. It will be seen, therefore, that current will flow in the output of the vacuum tube 43 between the points O and O' for each cycle.

The function of the rest of the circuit of Fig. 7 is to produce the reciprocal of the phase measurement between the point O and O' and measure the difference between the reciprocals of the phase between the units 14 and 13 and 15 and 13, respectively. In Fig. 7 in the output circuit of the tube 43 there is a constant voltage device 50 in which the resistance is inversely proportional to the current. The circuit in the lower half of Fig. 7 corresponds identically to that in the upper half of Fig. 7. In this case, however, the line 21 is connected with the transmitter 13 and the receiver 15 is connected through an amplifier 16' to the transformer 31' while the transmitted impulse is connected to the transformer 30'. All the rest of the lower half of the circuit is numbered in the same manner as the upper half of the circuit with the prime numbers corresponding to the same numbers in the upper half of the circuit. In the output of the tube 43' a constant voltage device 50' similar to 50 is placed. These two constant voltage devices are connected with proper impedances 51 and 51' in bridge fashion and a connection is made between their connecting points and the connecting points of the constant voltage devices. The voltage across these points between the double arrow 52 provides a measurement of the variable resistance in the circuit, as indicated by the voltmeter 53, which may be calibrated in velocities.

In the above circuit the output measurement of each phase difference measuring circuit 17 and 18 produces the quantities $\theta_1$ and $\theta_2$ and the combination as measured in the bridge circuit 54 produces the difference between the reciprocals of these phase measurements so that the resultant measurement in the speed indicator 53 is proportional to the velocity $v$ which is the velocity of the vessel or the relative velocity of the vessel and the medium in the component direction in which the measurements were made.

In place of the arrangement used in Fig. 1 a single transmitter 60 and single receiver 61 may be used and the measurement of phase may be between the direct impulse or electric wave and the electric wave corresponding to the received compressional wave picked up by the receiver 61. This phase difference may be measured by means of the circuit such as shown in Figs. 4 or 5.

The arrangement according to the present invention may, as indicated above, also be applied to measurement of wind or flow velocities in a given direction. An illustration of this is shown in Fig. 10 in which the transmitter 62 and the receiver 63 may be mounted on a freely pivoted base 64 supported in a free ball-bearing circuit 65, the platform 64 being provided with a vane 66 so that the platform will be oriented with the transmitter and receiver directed in the line of the wind. The velocity measurements then made will be, in event that the device is fixed in one place, the measurement of the air velocity or water velocity, if the device is used in the water, or more commonly known as velocity of flow.

In all the arrangements described above the transmitter may be of the electroacoustic type commonly known as transducers operating by electromagnetic, electrodynamic, electrostatic, magnetostrictive, piezoelectric principles, and likewise the receiver which converts the compressional wave to corresponding electrical variations may be of the same type. While the sinusoidal wave form is in many cases preferable, this is not always necessary since the principles used in the present invention and the circuits shown herewith may operate on other types of periodic impulses.

Having now described my invention, I claim:

1. A device for measuring velocities in a water medium which comprises means for transmitting compressional waves through the medium, means for receiving said compressional waves at different points in the medium corresponding to different directions of transmission of the compressional wave, means for measuring the phase difference between the electric wave corresponding to the compressional wave transmitted and the electric waves corresponding to the compressional wave received on each receiver, means for measuring the difference between reciprocals of said first measurements and means for converting said last difference to velocity measurements.

2. A device for measuring velocities in a water medium which comprises means for transmitting compressional waves through the medium, means for receiving compressional waves at another point in the medium, means interconnecting the transmitting and receiving means for controlling the transmitted wave from the wave received and means included in the latter means providing a squared law relationship proportional to the velocity of the compressional wave in the medium.

3. A device for measuring velocities in a water medium which comprises transmitting and receiving means, independent phase difference measurers for measuring the phase difference between the transmitted compressional wave and the received compressional wave at two different points, means providing a reciprocal of such phase differences and means associated therewith for indicating the velocity to be measured.

4. A device for measuring velocities in a water medium comprising transmitting and receiving means spaced in fixed position with reference to each other, independent phase difference measuring circuits, each including thermionic tube means having control grids having negative biases and anode-cathode circuits contained therein and controlled thereby having common anode connections and output elements in each anode-cathode circuit, a second thermionic tube circuit having a control grid and anode-cathode elements, means connecting said output elements in series opposing to said last control grid, said anode-cathode elements having a constant voltage device connected in circuit, said constant voltage device of each phase measurer being together connected in a bridge circuit, and a device indicating speed connected across said bridge circuit.

5. In a device for measuring velocities in water, a phase measuring circuit comprising thermionic tube means and circuits including a pair of input control grids and a pair of anode-cathode circuits having a common anode connection and output impedances in each anode-cathode circuit, a second thermionic tube and circuit having a control grid and an anode-circuit, the output impedances being connected in series opposing with the control grid of the second thermionic tube and phase measuring means connected in the output of the second thermionic tube circuit.

WILLIAM C. GRABAU.

REFERENCES CITED

The following references are of record in the file of this patent:

UNITED STATES PATENTS

| Number | Name | Date |
|---|---|---|
| 1,790,080 | Stanton | Jan. 27, 1931 |
| 2,191,119 | Schlumberger | Feb. 20, 1940 |
| 2,202,885 | Zuschlag | June 4, 1940 |
| 2,257,423 | Malmqvist | Sept. 30, 1941 |
| 2,274,262 | Wolff | Feb. 24, 1942 |
| 2,328,546 | Cafarelli, Jr. | Sept. 7, 1943 |

Certificate of Correction

Patent No. 2,480,646 August 30, 1949

WILLIAM C. GRABAU

It is hereby certified that error appears in the printed specification of the above numbered patent requiring correction as follows:

Column 8, line 14, for "anode-circuit" read *anode-cathode circuit*;

and that the said Letters Patent should be read with this correction therein that the same may conform to the record of the case in the Patent Office.

Signed and sealed this 3rd day of January, A. D. 1950.

[SEAL]

THOMAS F. MURPHY,
*Assistant Commissioner of Patents.*